United States Patent Office 3,667,709
Patented June 6, 1972

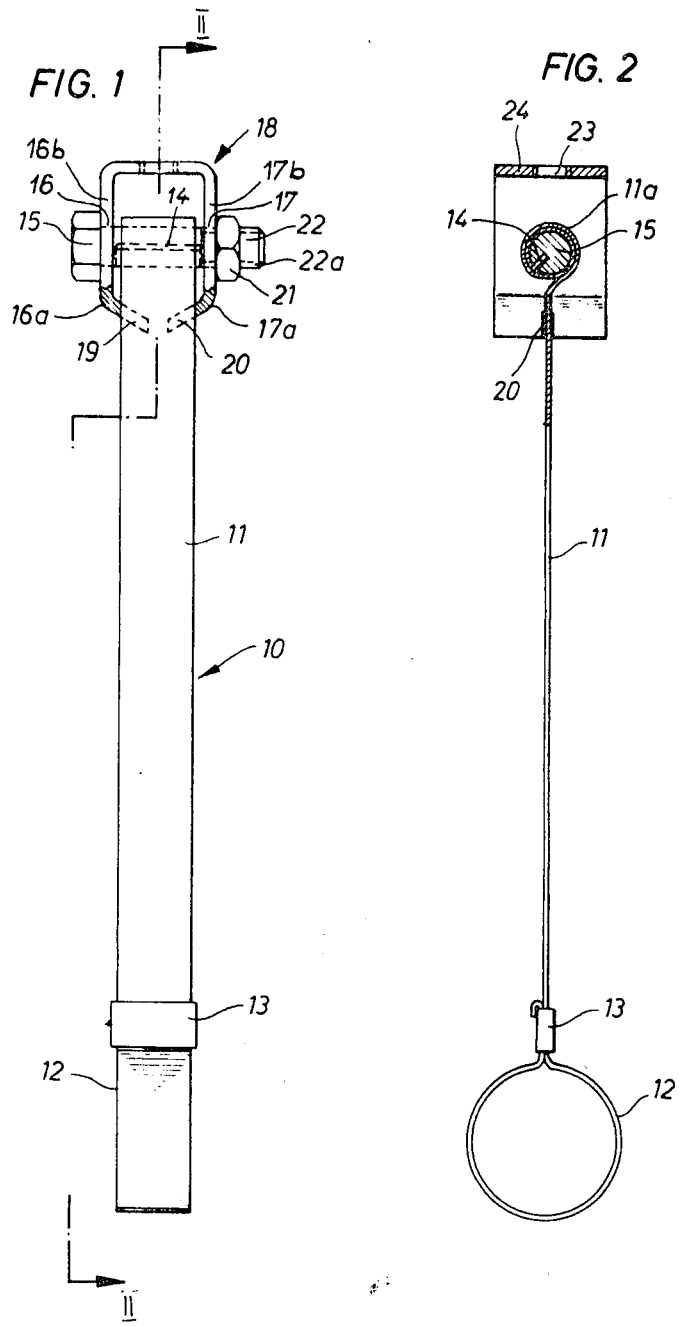

---

3,667,709
LENGTHWISE ADJUSTABLE SUSPENSION DEVICE FOR ARTICLES, PARTICULARLY SANITATION AND HEATING PIPES
Rudolf Linser, Renningen, Germany, assignor to Stanzwerke Glarus AG, Buchholz, Switzerland
Filed Sept. 25, 1970, Ser. No. 75,323
Int. Cl. F16l 3/14
U.S. Cl. 248—59    4 Claims

ABSTRACT OF THE DISCLOSURE

A lengthwise adjustable suspension device for articles, such as in particular sanitation or plumbing pipes and heating conduits, which is of the type incorporating a suspension band member provided at one end thereof with an attachment element to which there can be secured the article which is to be suspended. The invention contemplates the provision of mechanism for regulating the suspension length of the article supported by the band member, such mechanism embodying a rotatably mounted element onto which there can be wound-up and wound-off one end of the band member.

BACKGROUND OF THE INVENTION

The present invention broadly relates to adjustable suspension mechanisms for articles, and, more specifically, relates to a new and improved lengthwise adjustable suspension device for members, as especially sanitation or plumbing pipes and heating conduits or pipes.

There are already known to the art different constructional forms of lengthwise adjustable suspension devices for elements or articles, especially for sanitation pipes and heating pipes, which incorporate mechanism for regulating the suspension length of the suspended articles. Yet, these prior art suspension systems all possess the drawback that adjustment of the length of the suspension mechanism is relatively cumbersome.

Thus, with known pipe suspension mechanisms utilizing a band member the necessary suspension length of the articles is measured at the situs of erection, the band is correctly cut and appropriately bored, then secured to a ceiling or a wall by means of a screw or the like. It is also known to equip the suspension band with a series of holes or bores for the purpose of regulating the suspension length.

Furthermore, a suspension device has become known to the art which utilizes a band member drawn through a slot provided at a suspension element of a pipe clamp or strap until there is obtained the desired length of the band member, this band member then being clamped against the suspension element of the pipe clamp by means of an appropriately mountable clamping member. The end of the band member which protrudes past and out of the clamping member is flexed back towards the clamping member externally thereof. The adjustment possibilities afforded by this construction is not only extremely cumbersome, rather among other things, also results in the band member being unfavourably stressed or loaded at the sharp bend locations.

SUMMARY OF THE INVENTION

Therefore, a real need exists in the art for a suspension device for articles, such as plumbing or sanitation pipes and heating pipes, which is not associated with the aforementioned drawbacks of the prior art constructions. A primary objective of this invention, therefore, is to provide just such suspension device which effectively fulfills this need.

Another, more specific object of the present invention is to provide a new and improved lengthwise adjustable suspension device which allows for considerably better and simpler lengthwise adjustability of the suspended articles.

Still, a further object of the present invention relates to an improved lengthwise adjustable suspension device for articles, especially plumbing and heating pipes or the like, which is relatively simple in construction, economical to manufacture, not readily subject to breakdown, extremely easy to use, and affords rapid and simple adjustment of the suspended length of the article with a minimum of effort.

Yet a further significant object of this invention relates to an improved suspension device for pipes and other articles used in the building industry wherein suspension of the article at a desired location can be undertaken extremely quickly, accurately and reliably, at the place of erection of the article, with minimum effort and without requiring on-site modification of the system.

Another equally significant object of this invention relates to an improved adjustable suspension mechanism for articles, typically pipes and conduits used in plumbing and heating installations, wherein the suspension height of the article can be quickly adjusted through an infinite number of positions within the existing capabilities of the system and specifically the effective length of the supporting band member can be easily varied through the provisions of a simply operated wind-up mechanism for such band member.

Now, in order to implement these and still further objects of the invention, which will become more readily apparent as the description proceeds, the invention lengthwise adjustable suspension device for articles, typically for instance sanitation or plumbing pipes and heating pipes, comprises mechanism for adjusting the suspension length of the articles which incorporates a band member equipped at one end with an attachment element for the article, this adjusting mechanism embodying a rotatable element upon which there can be wound-up and wound-off one end of the band member for the purpose of regulating the length thereof.

Furthermore, the inventive lengthwise adjustable suspension mechanism affords during continuous lengthwise adjustability thereof the possibility of simultaneously avoiding the presence of extreme stresses or loads being applied to the band material since the radius of curvature thereof during rolling-up of such band material is limited to the radius of the rotatable element. It is advantageous to construct the rotatable element in the form of a bolt member for instance, but, however, such can also be designed as a hose clamp or connection (for instance in the form of a split pin), as a roller or the like.

According to a preferred constructional form of the invention the rotatable element serving to wind up the band member can tension or urge towards one another the walls of a, for instance, U-shaped or similar suspension element, the band member being passed between the walls in such a way that upon tensioning the rotational element between the walls it is fixedly clamped to additionally secure such against unintentional changes in length.

BRIEF DESCRIPTION OF THE DRAWING

The invention will be better understood and objects other than those set forth above, will become apparent from consideration is given to the following detailed description thereof. Such description makes reference to the annexed drawings wherein:

FIG. 1 is a schematic side view, partially in section, of a preferred embodiment of inventive suspension device; and FIG. 2 is a cross-sectional view of the suspension device of FIG. 1, taken substantially along the line II—II thereof.

DETAILED DESCRIPTION OF THE PREFERRED EMBODIMENT

Describing now the drawings, the exemplary embodiment of pipe suspension device depicted in the drawings, has been generally designated by reference character 10, and will be understood to embody a suspension band member 11, formed of metal for instance, although it could also be formed of a suitable fabric, one end of such suspension band member 11 being designed or constructed to provide a pipe clamp 12 which can be secured by a metal clip 13 or the like at the suspension band member 11 for undertaking a possible coarse adjustment. The upper windable end 11a of the suspension band member 11 is introduced through a longitudinal slot 14 of a rotatable bolt member 15 serving as a rotatable element. Rotatable bolt member 15 is rotatably mounted in the bearing means 16 and 17 of the walls 16b and 17b of a substantially U-shaped suspension element 18.

Additionally, in order to guide the suspension band member 11 there are provided guide slot means 19 and 20 at the inwardly flexed leg portions 16a and 17a of the bearing walls 16b and 17b. These bearing walls 16b and 17b possess a mutual spacing from one another which is slightly greater than the width of the band member 11. The guide slots 19 and 20 preferably are disposed approximately in a plane extending through the central axis of the rotational bolt member 15, so that the band member 11, as shown, when passing between the guide slots 19, 20 and the circumference of the rotational bolt member 15 is bent through a substantially S-shape, thereby counteracting undesired winding-up of the band member under the action of tensional forces.

In the exemplary embodiment illustrated herein, the rotational bolt member 15 is designed as a threaded bolt in such a manner that when a nut member 21 is threaded onto the nut-receiving end 22 of the bolt member 15 equipped with threading 22a and extending past the bearing 17, the bearing walls 16b and 17b of the suspension member or element 18 are stressed or biased towards one another. Consequently, the rotational bolt member 15 is secured against rotation and the suspension band member 11 is simultaneously secured against any undesired changes in length due to the clamping action exerted by the flexed portions 16a and 17a of the walls 16b and 17b respectively.

Now, for the purpose of adjusting the length of the suspension band member 11 the clamping nut member 21 is loosened and by appropriately rotating the rotational bolt member 15 the suspension band member 11 can be selectively wound-up or wound-off such bolt member.

A mounting bore 23 provided at a transverse web 24 of the suspension element 18 serves to receive an attachment screw, a clamp, or equivalent element, for the purpose of attaching the suspension system to a wall, a ceiling or other appropriate carrier or mounting element, by way of example.

If desired, the attachment element for the articles, here shown as a pipe attachment clamp or strap 12, can be mounted as a separate element to the suspension band 11. With the modified version of the invention under consideration, it is also possible to arrange the specially designed adjustment mechanism, which in the exemplary embodiment is shown provided at the suspension element 18, at the attachment element or pipe clamp 12. Finally, as already mentioned above, instead of forming the suspension band member 11 of metal it could also be fabricated from a suitable textile material or fabric.

While there is shown and described preferred embodiments of the invention, it is to be distinctly understood that the invention is not limited thereto but may be otherwise variously embodied and practiced within the scope of the following claims.

Accordingly, what is claimed is:

1. A lengthwise adjustable suspension device for articles, especially sanitation pipes and heating pipes, comprising means for suspending the article which incorporates a suspenson band member and an attachment element for securing the article to be suspended, said attachment element being provided at the region of one end of said suspension band member, and mechanism for regulating the suspension length of the articles which includes a rotatably mounted element cooperating with an end of said band member onto which said band member can be selectively wound-up and wound-off in order to regulate the suspended length of said band member, a suspension housing element, said rotatably mounted element being rotatably supported by said suspension housing element, said suspension housing element incorporating oppositely situated wall members provided with bearing means for rotatably supporting said rotatably mounted element, said suspension housing element being further provided with slot means for introducing said band member between said wall members into the interior of said suspension housing element, means provided for said rotatably mounted element for biasing said bearing means towards one another and for fixedly clamping in selected position said rotatably mounted element, whereby upon fixedly clamping said rotatably mounted element in selected position said wall members fixedly clamp said band member in position to prevent undesired changes in length of said band member.

2. A lengthwise adjustable suspension device as defined in claim 1, wherein said bearing means define at least an approximately U-shaped component having leg portions engaging about said band member.

3. A lengthwise adjustable suspension device as defined in claim 2, wherein said leg portions of said approximately U-shaped component define inwardly flexed leg portions providing said slot means for guidingly receiving said band member.

4. A lengthwise adjustable suspension device as defined in claim 3, wherein said slot means and said rotatably mounted element are positioned relative to one another such that said band member moves through a substantially S-shaped arc when passing through said slot means and when wound upon said rotatably mounted element.

References Cited

UNITED STATES PATENTS

| 2,780,429 | 2/1957 | Vanier | 248—59 |

FOREIGN PATENTS

| 1,500,980 | 8/1969 | Germany | 248—59 |
| 290,547 | 5/1928 | Great Britain | 24—269 |

CHANCELLOR E. HARRIS, Primary Examiner